3,036,596
AUTOMATIC LEVELLERS FOR PNEUMATIC
SUSPENSIONS
Giuseppe Alfieri, Milan, Italy, assignor to Fabbrica Italiana Magneti Marelli S.p.A., Milan, Italy, a company of Italy
Filed Mar. 4, 1958, Ser. No. 719,118
Claims priority, application Italy Mar. 5, 1957
4 Claims. (Cl. 137—596.2)

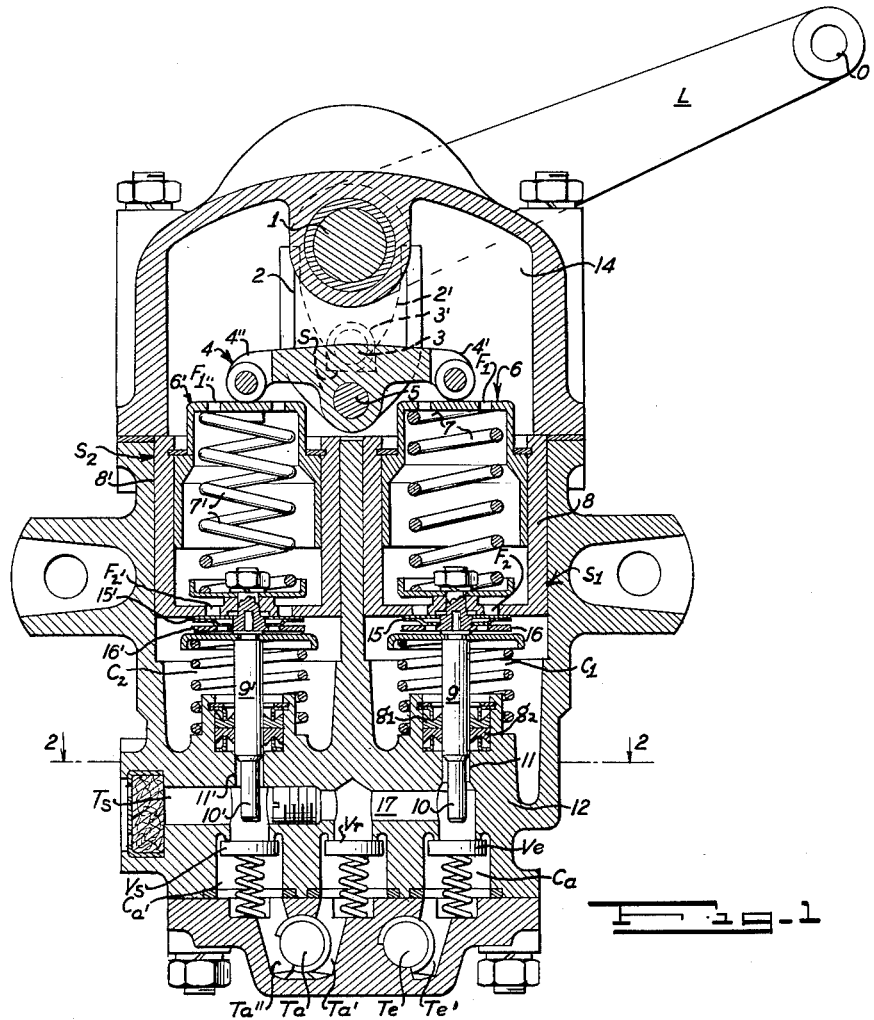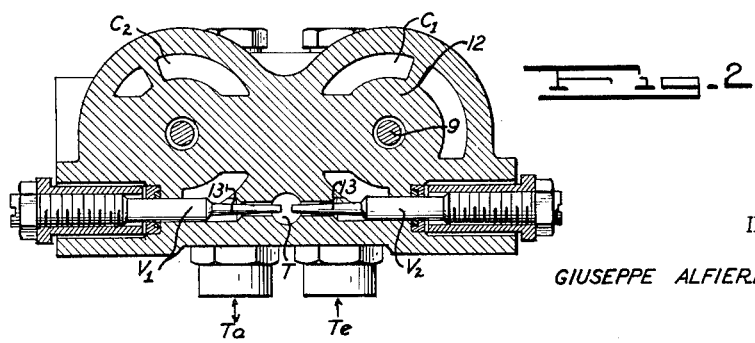

The present invention relates to a levelling mechanism for pneumatic suspensions, and more particularly to a self-adjusting device for controlling the pressure of the fluid contained in elastic members such as bellows mounted between the frame and the axle and wheels of a vehicle.

As is known, by the use of such elastic members held under pressure and controlled by an adjusting device, one may maintain the loading platform of a vehicle at constant height while the load acting thereupon is varying.

Obviously the adjusting device or leveller influencing the bellows must be conveniently connected to the vehicle so as to sense all persistent variations of load to which said vehicle may be subjected owing to any reasons.

The members common to all known levelling devices are constituted essentially by a lever connected at one end with the axle and wheels as a member sensitive to load variation, by a rocker associated to the movement of the lever and by two actuating sections controlled by the rocker or by the one or the other of the two arms thereof. Every section or distributor comprises, in addition to a slowing-down chamber, a mechanical assembly of members having the function of determining, by means of the inlet or discharge of fluid, variations of the pressure of the elastic members which are proportional to the variations of the load acting upon the vehicle.

The structural features of the automatic levellers in question are well-known in the prior art.

It is an object of the present invention to provide substantial modifications of said conventional levellers of the kind described, to improve them from the points of view of both operation and efficiency.

One of the main features of the device as improved according to the invention lies in the fact that the coupling between the lever sensitive to the oscillations of the axle and wheels of the vehicle, and the rocker associated thereto, is such as to cause the rotation of said rocker only at a determined stage of rotation of the lever. A further improvement of the device consists in the use of slowing-down chambers of the uni-directional kind. That is to say, only during the stage of actuation of the one or the other pressure chamber the fluid passes through the corresponding gauged throttled portion to reach the case-tank of the apparatus. At the release stage on the contrary, the reflux into the slowing-down chamber takes place through a special valve group of wide passageway.

The invention is hereinafter illustrated and described with reference to the accompanying drawing wherein FIGURE 1 indicates a vertical section of the device improved according to the invention and FIGURE 2 is a cross-section thereof taken along the axis 2—2.

With reference to the right-hand section of FIGURE 1 of the mechanism, with 1 is indicated the axis of rotation controlled by the lever L; with 0 the lever end connected to the axle and wheels of the vehicle; with 2 a plate rigid with the shaft 1 carrying at its lower portion a pin 3 and respective roll 3'. These latter two members are seated in a groove provided in the body of the rocker 4. With 4' there is indicated the rocker arm acting upon the piston 6 internal with respect to the piston $S_1$.

The movement of the slidable piston 6 is opposed by the spring 7. The piston $S_1$, which is in turn slidable in cylinder 8 of the body of the device, is connected rigidly to the tappet 9 in correspondence with the bottom; the free end 10 of the tappet 9 is very close to the inlet valve $Ve$. With $C_1$ there is indicated the slowing-down chamber filled with oil, and with 11 the sliding seat of the tappet 9, provided in the body 12; with $g_1$ and $g_2$ two gaskets of the tappet, with $C_a$ a chamber for compressed fluid connected through the conduits $Te'$ and $Te$ to the source of fluid supply, not shown in the drawing.

As for the left-hand section (or distributor) which is actuated by the arm 4" of the rocker 4, there is only to be said that it comprises the same component parts of the right-hand section, namely the piston 6', the spring 7', the piston $S_2$, the slowing-down chamber $C_2$, the tappet 9' with respective gaskets and valve $Vs$ for discharge.

The only difference with respect to the right-hand section is that the discharge valve $Vs$, when it is actuated by the tappet 9', puts the chamber $C_a$, and therefore, the bellows connected thereto, in communication with the atmosphere, through the conduit $Ts$. From the bellows the chamber $C_a$, is reached through the conduits $Ta$, $Ta''$.

As appears in FIG. 2 the slowing-down chamber $C_1$ and $C_2$ are connected by means of the respective adjustable throttled portions 13 and 13' to the conduit T which in turn leads into the case-tank 14.

Operation of the whole device is as follows:

If there occurs an increase of load on the vehicle and, therefore, a decrease of distance between the frame whereon the levelling device is mounted, and the axle and wheels, the lever L will displace upwards in anti-clockwise sense and, therefore, it will cause the rotation in clockwise sense of the rocker 4 about the fixed shaft 5 and in particular the rotation of the arm 4' of said rocker. By acting upon the piston 6, said arm loads the spring 7 in the piston $S_1$, and if the displacement of 4' is kept for a sufficient length of time, $S_1$ lowers and drives the tappet 9 down until the fluid inlet valve $Ve$ opens. With the opening of said valve, the compressed fluid coming from the source of supply reaches—through the conduits $Te$, $Te'$ and the chamber $C_a$—the conduit 17 where it comes to act upon the check valve $V_r$; the opening of the latter will permit fluid to flow into the conduits $T_a'$ and $T_a$ and from these into the bellows interposed between the frame and the axle and wheels. The increased pressure in said bellows causes an expansion which will restore the normal distance between the frame and axle-and-wheels while causing contemporaneously the clockwise rotation of the lever L until the rocker has attained its equilibrium position.

If instead of a diminution of load occurs, the lever L will shift in clockwise sense, the rocker 4 rotating in anti-clockwise sense will come to actuate through the arm 4" the piston $S_2$ as already said for the right-hand section. The displacement of this piston $S_2$ will cause downward movement of the tappet 9' which in turn will cause the opening of the valve $Vs$. In that way the bellows are put in communication with the atmosphere through the conduits $T_a$, $T_{a''}$, the chamber $C_{a'}$ and the conduit $Ts$. The outflow of fluid reduces the pressure existing in the bellows and thereby causes the collapsing thereof with consequent approach of the frame to the axle and wheels.

At the same time, there will occur an anti-clockwise rotation of the lever L until the arm 4" of the rocker actuated thereby, has attained the equilibrium position.

It should be noted that the connection between the shaft 1 and the rocker 4 is obtained, according to the invention, by means of the plate 2 which on one side is rigid with the shaft of rotation 1. The end of the other side carries a pin 3 with respective roll 3'. During the rotation (clockwise or anti-clockwise) of the lever L and, therefore, of the shaft 1, as will be understood, said plate will oscillate thereby dragging the pin-and-roll assembly along with it in rotation.

Since however the pin 3 and roll 3' are accommodated in a special groove or seat $s$ of the rocker 4, it will happen that during the oscillation the pin-and-roll assembly will come to act upon said rocker thereby causing its rotation in one sense or in the other sense. The coupling pin-and-roller/rocker however exists only during a very well determined stage of rotation of the lever L. That stage, beginning, for instance, from the equilibrium position of the system, corresponds to the initial rotation of the lever. Subsequently, the pin will leave the seat $s$ and will no longer exert any action of thrust upon the rocker, although remaining at contact therewith along the sliding surface 2'.

The particular profile given the sliding surface 2' of the rocker is such as not to involve any further displacements of the piston in addition to that occurred in the first rotation of the rocker in the stage of actuation or in the last rotation in the release stage. This provides an effective action of the retarders (delaying devices) prior to the opening of the inlet or discharge valves, although the total stroke of the pistons is of limited magnitude. A further improvement provided in known conventional devices is constituted by the fact that the two slowing-down chambers are not intercommunicating, but each one opens into the case-tank by means of uni-directional adjustable throttled portions. The uni-directionality of the retarders according to the invention causes the delaying action to be effected advantageously only in the control-distributor stage, leaving the piston strokes free in the release stage. The reflux of fluid in this stage (with reference to the right-hand section) takes place indeed through the holes $f_1$ of the piston 6 and the holes $f_2$ provided in the bottom of the piston $S_1$. It should be noted that the passage of fluid through those conduits cannot take place during the control stage, namely, when chamber $C_1$ is full with oil and a pressure is exerted. In fact, in that case the holes $f_2$ are occluded by the lamina or valve 15 pressed by the small spring 16 and the fluid can flow from the chamber of the retarders, to the case-tank 14 only through the throttled portion 13 and the conduit T.

The use of the double throttling (one for each chamber) affords among other things the possibility of effecting independent settings of the delays for the feed actuating piston and for the discharge actuating piston. Those settings are effected by operating respectively the screws $V_1$ and $V_2$.

I claim:
1. A device for adjusting pneumatic pressure, by means of hydraulic retarders, for the control of the feed of pneumatic suspensions of a vehicle according to the load variations on said vehicle, said device comprising: a case tank, two parallel hydraulic cylinders, two retardation chambers, each of which is arranged beneath one of said cylinders each said chamber having a lowermost wall, hollow and cup-shaped pistons slidable within said cylinders and holes provided in the lowermost wall of said chambers, tappets affixed to the bottom of said pistons and passing in fluid tight relationship through said holes of said chamber, valves arranged in correspondence with the ends of said tappets, one of these valves being located between a suspension port and a pressure port and the other valve between said suspension port and a discharge means, a check valve being located between said first valve and said suspension port, hollow and cup-shaped spring loaded pistons slidable within the first said pistons and acting, through the tappets fixed thereto, upon the corresponding valves, openings being provided in said spring loaded pistons and in the first said pistons to allow passage of fluid from the case tank into said chambers, unidirectional valve means affixed to the bottoms of the first said pistons in correspondence with said openings, a conduit parallel to the longitudinal axis of the device and opening into said case tank, transverse conduits connecting said chambers with the first said conduit, throttling means in said transverse conduits, a rocker rotatable about a fixed axis, perpendicular to the plane of the axis of said hydraulic cylinders, said rocker including arms acting upon said spring loaded pistons, a shaft, roller means on said shaft and adapted for engaging said rocker, a lever about an axis parallel to the axis of rotation of the rocker and fixed to said shaft, and means on said rocker co-operating with said rolling means for causing quick rotations of the rocker limited to a fraction of the angular stroke of said lever.

2. A device as claimed in claim 1, wherein said rolling means include a roller and said means on said rocker includes a seating for receiving said roller and causing said quick rotations of said rocker, and cylindrical surfaces adjacent said seating and on which said roller is allowed to slide without causing any further rotations of said rocker.

3. A device as claimed in claim 1, wherein said unidirectional means comprises diaphragms for closing said holes to allow free passage of fluid from said tank to said chambers only during the return stroke of said hydraulic cylinders.

4. A device as claimed in claim 1, wherein said throttling means in said transverse conduits are adjustable independently of one another to allow for adjusting the retardation of either hydraulic cylinder with respect to the other.

References Cited in the file of this patent
UNITED STATES PATENTS

| | | |
|---|---|---|
| 1,588,658 | Christiansen | June 15, 1926 |
| 2,054,183 | Ackeren | Sept. 15, 1936 |
| 2,646,072 | Seabald | July 21, 1953 |
| 2,670,201 | Rossman | Feb. 23, 1954 |
| 2,881,799 | Menewisch | Apr. 14, 1959 |

FOREIGN PATENTS

| | | |
|---|---|---|
| 587,753 | Great Britain | 1947 |